Feb. 8, 1955 — A. H. MERRILL — 2,701,423
EDUCATIONAL DEVICE WITH INTERFITTABLE PROBLEM AND ANSWER MEMBERS
Filed Feb. 1, 1952
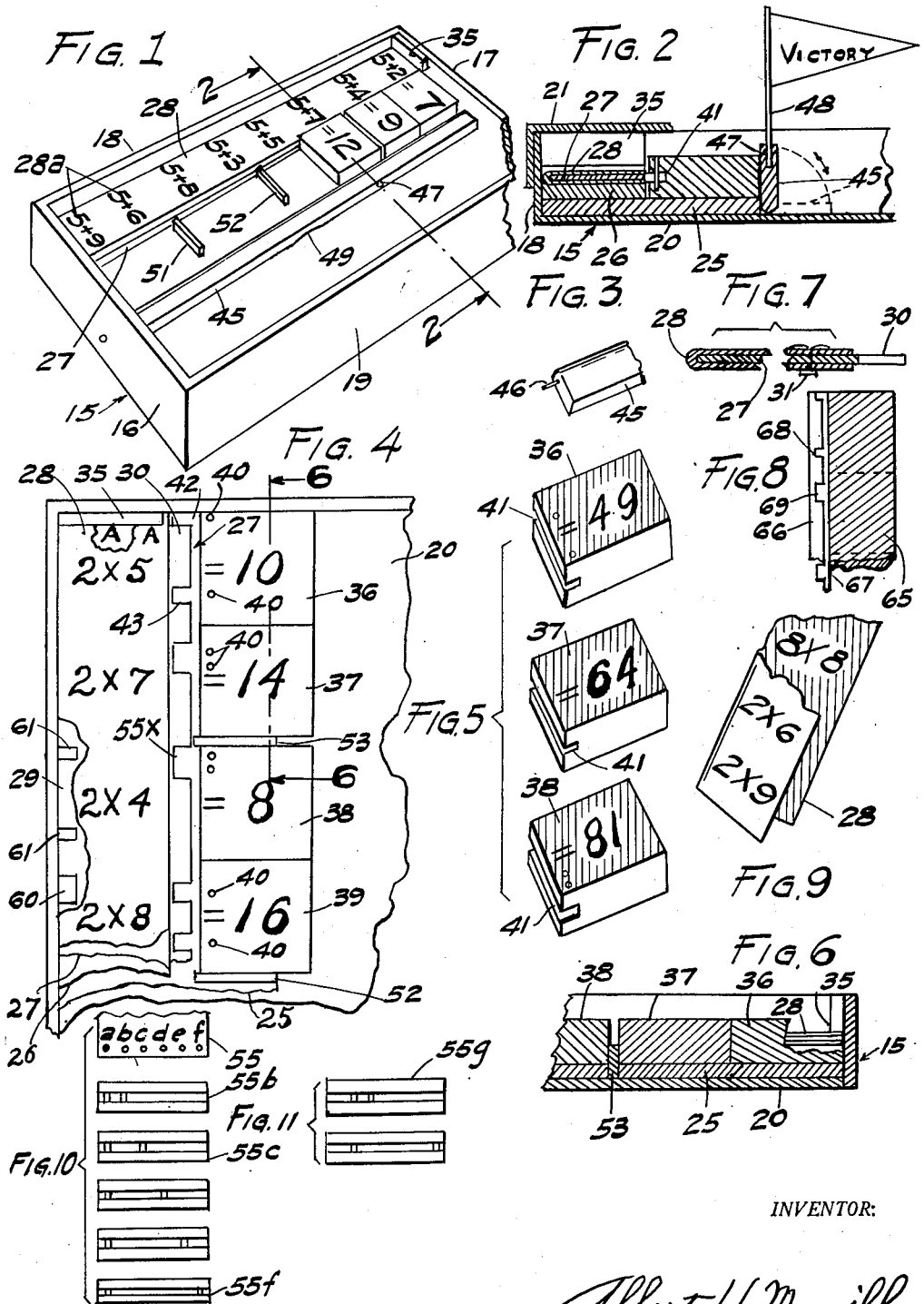
INVENTOR:
Albert H. Merrill United States Patent Office 2,701,423
Patented Feb. 8, 1955

2,701,423
EDUCATIONAL DEVICE WITH INTERFITTABLE PROBLEM AND ANSWER MEMBERS

Albert H. Merrill, Los Angeles, Calif.

Application February 1, 1952, Serial No. 269,456

16 Claims. (Cl. 35—9)

This invention relates to an educational device comprising members, upon which problems are inscribed, used in combination with answer bearing members, the latter members interfitting with the former only when so positioned as to indicate the correct answer to any given problem.

In the art to which this invention pertains it is not broadly new to provide problem and answer members which interfit only when properly mated, this having been done, for example, with cardboard problem and answer members made on the jig saw puzzle principle; but this invention improves upon devices of that kind in important particulars, one object thereof being to provide a problem and answer device wherein wooden or plastic answer blocks can be used to better advantage, these being more interesting to children than pieces of paper or pasteboard.

Furthermore, in using an educational device wherein problem and answer members cut out of sheet material are interfittable according to the jig saw puzzle principle, a child does not necessarily have to know the correct answer to any given problem in order quickly to interfit the proper problem and answer members, but need only to observe which answer member is so contoured as to interfit with the corresponding problem member; therefore such devices are defective as memory trainers. This defect is mostly overcome by the present invention, because the selector or mating elements carried by answer bearing blocks or their equivalents are sufficiently concealed to make it difficult for the child to detect whether or not they match the complementary mating elements of the problem bearing members.

Yet another object of the present invention is to provide, to encourage children in using the device, a novel mechanical "victory" or successful problem solution indicator which, after performing a supposed correct answer block solution of a set of problems, cannot be put into its correct solution indicating position unless the correct answer bearing blocks have been selected.

A more specific object is to provide, to detect whether or not the correct answer bearing members are selected, an improved error detecting means with complementary mateable parts, which can in its entirety, or at least, for the most part, be rapidly stamped out by dies, thus reducing cost of manufacture, yet avoiding the already mentioned objectionable features resulting from using pieces of sheet material made on the jig saw puzzle principle.

Other objects, advantages and features of invention will hereinafter appear.

Referring to the accompanying drawing, which illustrates a preferred embodiment of the invention, Fig. 1 is a perspective view of the device, including a few answer blocks, which are typical of those used to answer the considerable number of problems coming within the scope of the device. A part is broken away to contract the view, and the cover is omitted.

Fig. 2 is a fragmentary, larger scale cross section on line 2—2 of Fig. 1. The correct solution indicator is shown in full lines in the erect position with the "Victory" flag or pennant in place, and in dotted lines in the recumbent position without the flag. A fragment of the cover is shown.

Fig. 3 is a fragmentary perspective showing one of the trunnion carrying end portions of the swingable correct solution indicator.

Fig. 4 is an enlarged, fragmentary plan view illustrating the cooperative relation of variously notched lip sections of the problem bearing member shown with the selector means carried by the answer bearing blocks.

Fig. 5 is a perspective view collectively showing three of the answer blocks of Fig. 4, illustrating the invertible character of said blocks, which doubles their capacity for answering problems.

Fig. 6 is a fragmentary cross section on line 6—6 of Fig. 4.

Fig. 7 is a fragmentary cross section, illustrating on an enlarged scale how a cardboard problem bearing slip may be detachably carried by any one of the elongated plates which have notched selector lips.

Fig. 8 is a fragmentary section illustrating an alternative construction of the selector means contained in the grooved portion of the answer blocks. This view shows a fragment of a grooved parent strip (which may be wood), from which the individual answer blocks may be cut.

Fig. 9 is a fragmentary perspective of one of the foldable problem bearing slips.

Figs. 10 and 11 are views diagrammatically illustrating the principle according to which the selector pins (or their equivalents), of the answer blocks are desirably arranged.

Referring in detail to the drawing, therein is shown a somewhat elongated rectangular tray or lower box section 15 having end walls 16 and 17 and side walls 18 and 19, these four walls upstanding from a floor or bottom 20. When the device is not in use it may have applied to it a cover 21, fragmentarily shown in Fig. 2.

Viewing the device as shown in Figs. 1 and 2, a relatively thick base plate 25 is glued or otherwise fastened to the bottom 20, this plate extending from the side wall 18 to about the midwidth of the tray 15. Also a riser strip 26, about half as wide as said plate 25, but of about the same thickness, is shown superimposed upon the left half of said plate, said strip 26 also contacting the side wall 18. This riser strip is desirably, but not necessarily, glued or otherwise secured to the underlying base plate; or it may be made integral with said plate, in either case providing the latter with a stepped up part extending lengthwise thereof.

One or more elongated selector plates 27 are provided to have associated with them problem bearing slips, a typical problem bearing slip 28 being shown in Figs. 4, 7 and 9. The latter two views show how said problem bearing slip may be folded along its midlength and applied to the plate 27 so as to enclose all of said plate except one of the two notched lips 29 and 30 with which said plate is provided along its side edges. In Fig. 7 a bendable fastener 31, occupying alined holes in the folded slip and intervening plate, is shown securing said slip to said plate.

A small cleat 35 is tacked or otherwise secured internally to each end wall of the tray 15, these cleats being slightly spaced above the aforesaid riser strip 26; and when the composite problem bearing means or member consisting of a plate 27 and applied, folded numeral bearing slip 28 is put into its mounted position, the end portions of said problem bearing means are fitted into the spaces between said cleats and the subjacent riser strip 26, it being understood that this is done before any of the answer bearing blocks, presently to be described, are put into their answer indicating positions.

In Fig. 4 is shown a series of typical answer bearing block 36, 37, 38 and 39 seated upon the base plate 25 in readiness to be moved to positions wherein the selector pins 40 which they carry (said pins extending through grooves 41 in said blocks as shown in Figs. 2 and 5), enter selector notches in the aforesaid lip 30 of the selector, problem bearing plate 27. As shown in Fig. 2, said selector plate is supported by the riser 26 in horizontal alinement with the block grooves 41.

That section of said selector plate 27 which carries "2 x 5" has in its lip 30 cut-outs or notches 42 and 43 which are so spaced that, when the grooved portion of the block 36 is placed astride said section of said lip, the two pins 40 carried by the block will register with the notches in the lip; and, therefore, said block may be moved leftward to the position shown in Fig. 2, and slightly farther. The fact that the block can be thus positioned proves that it bears the correct answer to two times four, for if any of the other blocks (for example, one of the other blocks shown in Fig. 4), were to be substituted, the differently spaced pins carried by such block would contact the lip 30 between notches, and said pins would function as stops and arrest the leftward movement of the block before its right hand side alined with the right hand edge of the base plate 25, the position of the block shown in Fig. 2.

In Fig. 1 the upper face portion of a problem bearing slip 28 is shown having, extending along its length, a series of eight problem indications 28a. In Fig. 2 a swingable correct solution indicator 45 is shown in dotted lines in its recumbent, inoperative position, it being impossible to place this indicator in its erect, operative position after putting the eight answer blocks in place, if any of said blocks have been incorrectly selected, for any incorrectly selected block will project beyond the right hand side of the base plate 25 and will consequently prevent upswinging of said indicator, because the latter swings about an axis located close to said base plate.

Said indicator 45 swings upon trunnions 46 (one of these being shown in Fig. 3), journaled in the end walls of the tray 15. This indicator has a socket 47 therein, which extends at a right angle to the axis of its swing, to receive the lower end portion of the staff 48 of a miniature "Victory" flag or pennant, which a child may erect to celebrate the successful solution of a group of problems. A scallop 49 in the swingable indicator 45 (see Fig. 1), facilitates the manual upswinging thereof.

Means may be provided to assist the user of the device in guiding the aforesaid answer blocks across the exposed surface portion of the base plate 25 to positions wherein they register accurately with the sections of the selector plates 27 with which they are mateable. Accordingly, three identically shaped and dimensioned fins 51, 52 and 53 are shown in the drawing, said fins being so spaced that, in combination with the end walls of the tray, one side or edge of each mounted block encounters a guiding and spacing member. The fin 53 is shown in section in Fig. 6, where its lower edge portion is shown fitted into a slot provided for it in the base plate 25, and the fin is seen to be sufficiently narrow to prevent its upper edge from obstructing putting the aforesaid problem carrying means into its mounted position under the cleats 35 which overlie its end portions.

Owing to the groove 41 of each answer block being located at its midwidth, said block may be used with either of two opposite answer bearing faces uppermost, thus doubling the number of problems the blocks can be used to answer without adding to the cost of the selector means carried by the blocks.

Figs. 10 and 11 illustrate a selector system according to which a set of fifteen answer blocks can be used in combination with one or more selector plates having notched lip portions divided into longitudinally extending series of sections, only one block being mateable with each section. According to this system two selector pins are carried by each block, each pin being inserted at a point in the row of points lettered *a* to *f* in the upper portion of Fig. 10, where a fragment of a typical answer block 55 is shown including the grooved side portion thereof where the selector pins are located.

Fifteen blocks are sufficient to teach completely an addition table beginning with two plus two and ending with nine plus nine, as the lowest sum will be four and the highest eighteen, making fifteen sum indicating numbers in all. Using the aforesaid selector plan for such a table, the lowest sum, four, will logically be represented by the pin combination *ab*, shown in the block 55*b*; and the next higher sum, five, will be represented by the pin combination *ac*, carried by block 55*c*. Thus the pin arrangement may proceed until the pin combination *af*, carried by block 55*f* is reached, which will be used for the block having "8" inscribed upon it. This will complete the selector series beginning at the point *a*. The next higher sum, ten, will be accompanied by the pin combination *bc* shown in the upper block 55*g* of Fig. 11. There will be four pin combinations in the series beginning with the pin location *b*, the fourth combination being represented by *bf*, which will accompany the block bearing "*i*2." Then there will remain the *cd*, *ce* and *cf* series; the *de* and *df* series; and the *ef* combination, the latter completing the fifteen above mentioned selections. If seven, instead of six, locations are provided for the pins, twenty-one selector distinctions will result.

As shown in Fig. 4, the lip portions 29 and 30 of the problem bearing selector plate 27 are variously contoured, due to the different manner in which they are notched. The notches in these lips are so dimensioned and spaced that an answer block for a given problem can be mated only with that section of said plate which carries the problem answer by the block. When two pins are located at adjacent points in the aforesaid *a* to *f* series a wide notch is provided to mate with them, like the notch 55*x* which is positioned to admit the *ab* pin combination of block 38.

The lip 29 of the selector plate 27 has in it a series of selector notches which will represent a different series of problems from those of the lip 30, Fig. 4 showing in said lip 29 a wide notch 60 and narrow notches 61 where the overlying slip 28 is broken away. Said selector plate can be inverted, as well as reversed as to the positions of its ends, and, therefore, can be used to represent four different columns of problems, corresponding to the columns of problems carried by the problem slip attached to said plate, or displayed by the uppermost of a pack of problem bearing slips mounted thereon with the end portions of the pack nested under the aforesaid cleats 35.

The upper face of the plate 27 of Fig. 4 is shown (in the break in the overlying structure), provided with an index letter "A" and the upper face of the slip 28 is likewise indexed "A," enabling the operator to associate the right problems with the right row of selector notches. It is to be understood that the remaining problem slip faces and notched plate faces will be provided with other duplicated letters to indicate their proper association.

In an elementary multiplication table beginning with two times six and ending with nine times nine (so that the smallest multiple is six and the largest eighty-one), thirty answer block faces properly inscribed with numbers are required to represent all the products contained in the table. This table may be divided into two sections in such a way that, by studying only one section at a time, only fifteen answer block faces will need to be used at the same time. And, owing to the blocks being usable with either answer bearing face uppermost, only fifteen blocks need be used for the entire table. In order to effect this, the fifteen higher multiples can be represented by block faces of one color, and the fifteen lower multiples by block faces of another color; and the faces of the problem strips carrying the corresponding problem groups can be correspondingly colored. Hence the upper faces of the blocks shown in Fig. 5 are colored red, but their opposite faces are uncolored in Fig. 4.

As an aid to manufacturing the device, it will be stated that, in using it to teach the aforesaid elementary multiplication table, the fifteen uncolored block faces will bear the following multiples: 6, 8, 9, 10, 12, 14, 15, 16, 18, 20, 21, 24, 25, 27 and 28. And the fifteen block faces colored red (or otherwise suitably colored), will bear the following multiples: 30, 32, 35, 36, 40, 42, 45, 48, 49, 54, 56, 63, 64, 72 and 81. Such multiples as forty-four will be omitted, because only products resulting from multiplying together numerals both of which are less than ten need be used.

Also care must be taken to place upon each problem bearing strip face only problems the answers to which are all found in only one or the other of the aforesaid two multiple groups. For example, "8×2" and "8×8" should not both be placed on the same strip face, because the product "16" appears on an uncolored block face, whereas the product "64" appears on a block face colored red, and only block faces of the same color are used at the same time. But part of the 8's can be inscribed on one problem slip face (for example, along with part of the 7's) and the remainder of the 8's carried by another problem slip face, and all the remainder of the multiplication table can be presented in a similar way.

In Fig. 8 is illustrated an alternative selector means for the answer bearing blocks, capable of functioning in the same manner as the selector means of the already described blocks. In this view is shown a fragment of a parent strip 65 (which may be wood), from which the individual blocks will be cut. Along the mid-thickness of one side of said strip extends a groove 66 into which is fitted and secured by glue, or otherwise, a strip 67, desirably of fiberboard or plastic, which fills the width of the groove, but occupies only its inner portion. This strip is provided with selector projections 68 and 69 which function in the same manner as the block carried, stop forming selector pins 40, etc., already described, the broader projection 69 functioning the same as two selector pins close together, for example, the pin combination of the upper block of Fig. 11.

The aforesaid alternative selector means for the answer blocks is particularly well adapted for those blocks which would otherwise carry a pair of closely adjacent pins, for example, the "ab" or "bc" combinations. In either case, owing to the groove in each completely formed block being open-ended, the grooving of the blocks may be rapidly performed with a suitable grooving tool before the individual blocks are severed from the parent strip 65. Said grooves extend from end to end of the sides of the individual blocks and only their inner portions are occupied by the aforesaid selector means.

In my co-pending applications, Serial Nos. 250,459 and 258,122, filed, respectively October 9 and November 26, 1951, and respectively maturing into Patents Nos. 2,645,038 and 2,645,041, foldable problem bearing slips are described, resembling the foldable problem bearing slips of the present application; said slips of my said earlier applications bearing pictorial as well as numerical problems; and it is obvious that pictorial as well as numerical problems may be used in the device of this application. Also the color scheme for the blocks and slips used in presenting and answering pictorial problems in my said application Serial No. 258,122, can be used on the slips and blocks of the present application in presenting pictorial problems.

As has already been stated, in teaching addition the answer block faces used should represent fifteen sums beginning with two plus two and ending with nine plus nine; but when subtraction is taught only eight results need be indicated, namely, numerals 2, 3, 4, 5, 6, 7, 8 and 9; it being deemed not worth while to include with the addition problems sums less than "4" or with the subtraction problems answers so small as unity. Accordingly, to teach both addition and subtraction seventeen block faces must be used, starting with a block face bearing "2" and ending with a block face bearing "18." In performing subtraction no answer larger than "9" is used, but answer blocks bearing "2" and "3" must be supplied. However, these two supplied blocks may carry the same selector means as the blocks bearing "17" and "18," and when working at subtraction the addition blocks bearing "17" and "18" will be put out of the child's reach so he cannot misuse them.

If fiberboard is used in making the problem bearing plate 27, and the selector strip 67 of Fig. 8, the selector notches may be cut out by the use of printer's steel rules, using which costs less than using dies.

If desired, the tray and cover portions of the device may be made wide enough to allow a base plate 25, riser strip 26 and problem solution indicator 45 to be placed in each side portion of the tray, like the duplicate arrangement of analogous parts shown in my aforesaid co-pending application Serial No. 258,122.

Preparatory to using the device the cover 21 will be removed from the tray and will be placed upon a desk or table with its inner side directed upwardly, and then there will be removed from said tray and deposited in said cover, with their proper faces uppermost, such of the blocks as are usable to provide answers to the set of problems to be answered by block selection, in accordance with the foregoing description. To present such a set of problems the proper problem bearing strip will be folded along its midwidth in such a way as to bring into view the desired column of problems and will then be applied to the selector plate under the guidance of the aforesaid index characters, examples of which are shown in the upper, left hand corner portion of Fig. 2. Then the selector will be put into its mounted position upon the riser strip 26, where its selector lip portion 30 will be positioned to co-operate with the selector means of each selected answer block moved thereagainst while the block is supported by the base plate 25; and the wall 18 of the tray will serve as an abutment to prevent the edgewise displacement of the problem bearing member that might otherwise result from contacting the answer blocks with its selector edge portion.

After eight blocks have been put into positions where they are supposed to indicate the correct answers to all the problems of the column, if the child is then able to erect the correct solution indicator 45, he will be gratified with the assurance that he has correctly answered all the problems. Otherwise, he will be told to remove the block or blocks which obstruct erection of said indicator and to endeavor to replace the removed block or blocks with one or more correctly selected blocks.

I claim:

1. An educational device of the kind described comprising a base plate carrying an elongated upwardly directed step, a problem bearing strip mountable upon said step in flatwise engagement therewith, the problems borne by said strip being in a row extending lengthwise thereof and lengthwise of said step when said strip is mounted thereon, said strip having a variously notched side edge portion, which, when the strip is in its mounted position upon said step projects horizontally from the upper side of the latter, a set of answer blocks from which is selectable a block bearing the answer to any one of said problems, and a selector means carried by each of said blocks, the selector means of each block being juxtaposable to a portion of said notched edge opposite to any one of said problems when said block is seated upon said base plate alongside said step, the selector means of said block mating only with the notches of that portion of said strip which bears the problem the answer to which is carried by said block.

2. The subject matter of claim 1, and the selector means of each of said blocks being located at the mid-thickness of the block, so that the blocks are seatable on said base plate in answer indicating positions with either of two opposite answer bearing faces uppermost.

3. In a problem and answer device of the kind described, a problem bearing member having an elongated face with a longitudinally extending series of problem indications located thereon, each problem indication being different from those of the other problem indications of the series, said member having alongside of each of said problem indications a selector side edge portion which is contoured differently from the selector side edge portions opposite to the remaining problem indications, basal supporting means having an upper surface upon which said elongated member is supported and held against displacement when in its mounted position and a lower surface alongside said upper surface, a set of answer blocks positionable upon said lower surface along said selector side edge portion of said elongated member when the latter is in its mounted position upon said upper surface, selector means carried by a side portion of each of said blocks, said blocks having each a face bearing an answer to a problem on said face of the mounted problem member, the selector means of each block being mateable only with the side edge portion of a said section of said elongated member which bears the problem answered by said block, and means carried by each of said blocks overlying and concealing its said selector means when the block has its said answer bearing face directed upwardly.

4. The subject matter of claim 3 wherein said means which conceals said selector means of each block consists of an elongated shoulder integral with the upper part of the block.

5. The subject matter of claim 3 wherein said means which conceals said selector means of each block consists of a recessed portion of the block within which its said selector means is concealed.

6. In a problem and answer device, a basal support, a problem bearing member seatable upon said support with an edge portion superjacent thereto, said member having a row of observable problems inscribed thereon alongside said edge portion, the part of said edge portion opposite to each of said problems being contoured differently from the parts of said edge portion opposite to the other problems, a set of blocks bearing each an answer to a different problem of said problems, selector means carried by each of said blocks, the selector means of each block being mateable only with that part of said edge portion of the aforesaid member which has opposite to it the problem answered by such block, said selector means comprising stops which prevent mismated blocks seated upon said basal support from being moved as close to said problem bearing member as can be moved blocks properly mating parts of said edge portion to which they are juxtaposed while seated upon said basal support, and a problem solution indicator positionable upon said basal support in a problem solution indicating position, placing of said indicator in its problem solution indicating position being obstructed by any of said blocks resting upon said basal support in a juxtaposed, mismated relation to said problem bearing member.

7. The subject matter of claim 6, and said indicator comprising a part attached to said basal support in a manner admitting of its adjustment to and from said problem solution indicating position.

8. The subject matter of claim 6, and said indicator comprising a part swingably attached to said basal support at a sufficient distance from the mounted problem bearing member to admit said blocks, when properly mating therewith, to be put into their answer indicating positions between said member and the axis about which said indicator is swingable, swinging of said indicator from a recumbent position up to a problem solution indicating position being obstructed by any block seated upon said basal support in a mismated relation to said mounted problem bearing member.

9. In a problem and answer device, an elongated plate to carry problems to be answered, said plate having a side edge portion divided into a longitudinally extending series of sections each of which is contoured differently from the others in accordance with a problem different from the other problems to be carried alongside it, and a four page elongated slip of sheet material having a fold line along its midwidth, said plate being insertable into the folded slip so that the latter envelopes the former with the exception of its aforesaid edge portion, each page of said slip carrying a longitudinally extending series of problems, and a set of blocks carrying the answers to said problems, each of said blocks carrying a selector means mateable only with an aforesaid section of said plate's edge which, when said slip is carried by said plate, is alongside a problem the answer to which is carried by the block.

10. The structure set forth in claim 9, and said plate and slip having registrable apertures, and a bendable fastener inserted through the registered apertures detachably to attach the slip to the plate when the plate is enveloped by the slip, as aforesaid.

11. In combination, a support, an elongated problem bearing member mountable on said support and bearing a longitudinally extending series of problems, a problem solution indicator mounted upon said support in a laterally spaced relation to said member and adjustable to and from a problem solution indicating position, a set of blocks each of which bears an answer to a problem borne by said member, so that said blocks can be used to answer a plurality of said problems, a selector means carried by said member alongside each problem thereon, a selector means carried by the individual blocks mateable only with the selector means of that part of said member which bears a problem the answer to which is borne by such block, mating selector means of said member and of any said block enabling the operator to place such block on said support closer to said member than a mismating block can be placed, placing of the aforesaid indicator in its problem solution indicating position being obstructed by any of said blocks mounted upon said support in a juxtaposed mismated relation to said problem bearing member.

12. The subject matter of claim 11, and said indicator comprising a part swingably attached to said support at a sufficient distance from the mounted problem bearing member to admit said blocks, when properly mating with the latter, to be put into their answer indicating positions between said member and the axis about which said indicator is swingable, swinging of said indicator from a recumbent position in relation to said support to a problem solution indicating position being obstructed by any block on said support in a mismated relation to said problem bearing member.

13. In a problem and answer device of the kind described, an elongated member having a longitudinally extending rigid lip projecting therefrom, said lip consisting of differently notched sections and said member alongside said lip bearing a longitudinally extending series of observable problems wherein each problem is opposite to a said lip section, the section of said lip alongside each problem being notched with a plurality of notches which provide such lip section with a contour which differs from the contour of the other sections of the lip, a set of answer blocks from which is selectable a block bearing an answer to any one of said problems, each of said blocks having a side portion from end to end of which extends a groove, and a selector means consisting of stops mounted in said grooves, the selector means of each of said blocks being interfittable only with the notches of that section of the aforesaid lip opposite to which is the problem the answer to which is carried by said block.

14. The subject matter of claim 13, said stops consisting of spaced apart pins extending across said grooves.

15. In a problem and answer device adapted for use in teaching an elementary multiplication table, a set of answer blocks wherein each block has a product of said table inscribed on each of opposite faces, the products of said table being divided into two sections, one containing the smaller and the other the larger products, each of said blocks bearing on one of its said faces one of said smaller products and on its opposite face one of said larger products, problem bearing members each of which in its operative position has an elongated upper face bearing a longitudinally extending column of problems, the products of which belong to one of said multiplication table sections, and bearing upon its lower face a longitudinally extending column of problems the products of which belong to the other of said multiplication table sections, said blocks being individually positionable alongside individual problems in said columns to indicate problem answers, a selector means carried by the portion of each of said problem bearing members whereon a given problem is inscribed, a support having a surface whereon any one of said problem bearing members is mountable with its said selector means slightly spaced away from said surface, and a selector means carried by each of said blocks midway between each of its said two faces and registrable with the individual selector means of a said problem bearing member mounted as aforesaid when a said block is placed alongside the mounted member with either of said faces of the block abutting said surface, the selector means of each block mating only with the selector means of a portion of said mounted member which carries a problem answered by the block.

16. In a problem and answer device of the kind described, an elongated member having a longitudinally extending rigid lip projecting therefrom, said member alongside said lip bearing a longitudinally extending series of observable spaced apart problem indicia, the part of said lip which is opposite to each indicated problem being provided with notches differently spaced apart from the lip parts which bear the other problem indicia, a set of answer blocks from which is selectable a block bearing an answer to any one of said problems, each of said blocks having a groove extending along a side thereof, said groove being shaped and dimensioned to receive said lip, and selector means within said grooves, the selector means of each of said blocks co-operating with said notches to admit of a deeper insertion into its groove of the lip of that part of said problem bearing member which carries the problem the answer to which is carried by said block than of the other parts of said lip.

References Cited in the file of this patent

UNITED STATES PATENTS

| | | |
|---|---|---|
| D. 163,085 | Bishop | May 1, 1951 |
| 163,912 | Birmeli | June 1, 1875 |
| 777,268 | Thompson | Dec. 13, 1904 |
| 1,050,327 | Aikins | Jan. 14, 1913 |
| 1,624,450 | Vershbinsky | Apr. 12, 1927 |
| 1,735,456 | Garman | Nov. 12, 1929 |
| 2,645,038 | Merrill | July 14, 1953 |
| 2,645,041 | Merrill | July 14, 1953 |